R. SIEGFRIED.
THRUST BEARING.
APPLICATION FILED MAR. 20, 1912.

1,215,314.

Patented Feb. 6, 1917.

WITNESSES:

INVENTOR
Robert Siegfried
BY
ATTORNEY

UNITED STATES PATENT OFFICE.

ROBERT SIEGFRIED, OF PITTSBURGH, PENNSYLVANIA, ASSIGNOR TO WESTINGHOUSE ELECTRIC AND MANUFACTURING COMPANY, A CORPORATION OF PENNSYLVANIA.

THRUST-BEARING.

1,215,314.     Specification of Letters Patent.     Patented Feb. 6, 1917.

Application filed March 20, 1912. Serial No. 685,061.

*To all whom it may concern:*

Be it known that I, ROBERT SIEGFRIED, a citizen of the United States, and a resident of Pittsburgh, in the county of Allegheny and State of Pennsylvania, have invented a new and useful Improvement in Thrust-Bearings, of which the following is a specification.

My invention relates to shaft bearings and it has special reference to thrust and guide bearing for vertical-shaft machines.

The object of my invention is to provide an automatically lubricated bearing, of the class above indicated, that shall be adapted to operate under relatively high-thrust pressures.

Another object of my invention is to provide a relatively simple and durable ball-bearing structure, in which the space occupied by the bearing balls is so restricted as to prevent churning or bubbling of the lubricating fluid.

In my Patent No. 1,204,505, filed of even date herewith, I have shown and described a guide bearing for vertical-shaft machines which is automatically lubricated and embodies means for preventing churning or bubbling of the lubricating fluid when the machine with which the bearing is associated, is operated at relatively high speeds.

According to my present invention, I provide a ball thrust bearing, combined with a guide bearing for vertical shaft machines, which is so constructed as to secure, by other means, the same advantages as are attributed to the guide bearing of my patent above referred to.

Figure 1:
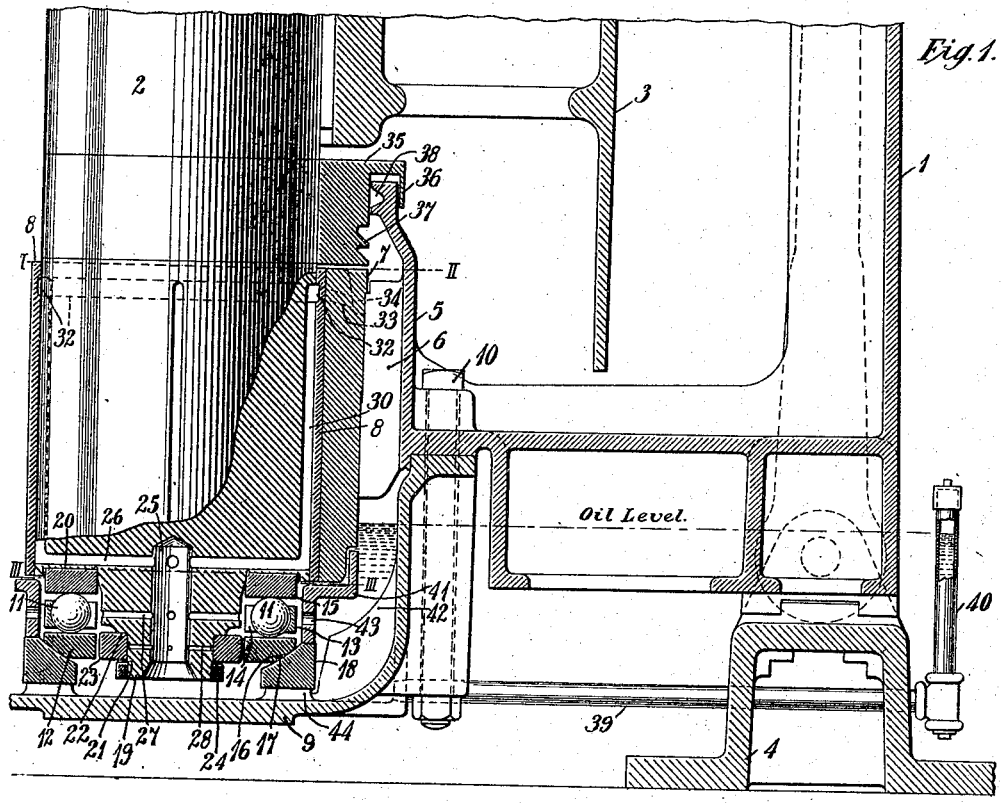
Figure 2:
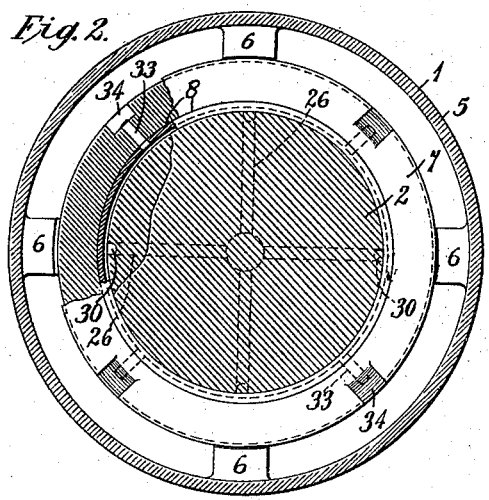
Figure 3:
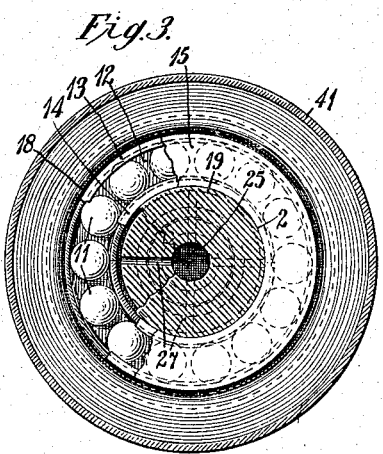

Figure 1 of the accompanying drawings is a sectional elevation of a portion of a vertical-shaft machine embodying the thrust bearing of my invention. Figs. 2 and 3 are sectional plan views respectively on the lines II—II and III—III of Fig. 1.

Referring to the drawings, the apparatus here shown comprises a stationary frame 1, a vertical shaft 2, to which a pulley 3 is secured, and supporting rails 4, only one of which is shown.

A substantially cylindrical bearing housing section 5 is integral with the stationary frame 1 and is provided with a plurality of radial ribs 6 on which a cylindrical bearing member 7 is supported. The member 7 is provided with a Babbitt or other soft metal lining 8, and the lower end of the vertical shaft 2 is fitted into it and extends through it.

A housing section 9, in the form of a cup or well, is removably secured to the frame 1 by bolts 10 (only one of which is shown) and coöperates with the housing section 5 to inclose the lower end of the vertical shaft and the bearing members.

The entire weight of the rotating parts of the machine is supported on a plurality of steel balls 11, which are confined to a circular path of travel in a substantially horizontal plane by a ball race. This race comprises a bearing ring 12 on which the balls are mounted, a pair of concentric guide rings 13 and 14, the adjacent surfaces of which are preferably shaped as shown in Fig. 1 to conform to a central section of the balls and a bearing ring 15 which is secured to the shaft 2 and rests on the bearing balls opposite the ring 12.

The bearing ring 12 is provided with a convex spherically curved surface 16 which is adjustably supported on a corresponding concave spherically curved surface 17 of a ring 18 which is mounted in the housing section 9. The shaft 2 is provided with a stepped projection 19 at its lower end, having a shoulder 20 which supports the bearing ring 15 and shoulders 21 and 22 which respectively constitute stops or guides for rings 23 and 24.

The lower end of the shaft 2 is provided with a recess 25, with which a plurality of sets of radial holes 26, 27 and 28 communicate. The holes 27 are approximately in the central plane of the bearing balls and terminate opposite the guide ring 14, the inside diameter of which is slightly larger than the shaft at this point.

The ring 23 is rotatably mounted on the shaft projection and is held in place by the ring 24 which is shrunk upon, or is otherwise secured to the end of the shaft projection. The ring 23 is loosely fitted into the ring 12 and is intended to maintain a coaxial relation between the rings 12 and 15, irrespective of variations in the alinement of the shaft by automatic adjustment the position of the ring 12 on the supporting ring 18.

The ring 23 usually rotates with the shaft, but, if the shaft should fall out of its initial alinement by reason of excessive wear on one side of its guide bearings, the ring 12 will be forcibly adjusted into a concentric position by the engagement of the ring 23 therewith.

The pressure on the several bearing balls is equalized by the automatic adjustment of the ring 12 on the ring 18.

The section of the shaft 2, which is engaged by the member 7, is provided with longitudinal grooves 30 which communicate, at their lower ends, with the holes 26 and, at their upper ends, with an annular groove 32 in the bearing member 7. The bearing member 7 is provided with a plurality of radial holes 33 terminating in slots 34 from which oil is discharged into the housing.

An oil-thrower ring 35 is secured to the shaft just above the bearing member 7 and is provided with a flange 36 which overhangs the top of the housing section 5. The ring is provided with an oil discharge projection 37 and the upper end of the housing is provided with an annular groove 38, to prevent oil or other lubricating fluid from traveling up the shaft or leaking out of the housing.

The housing section 9 constitutes an oil well and is connected by a pipe 39 to a sight tube 40, which is located outside of the frame of the machine.

An annular baffle member 41 is mounted on the integral ring 18 and the housing section is provided with radial ribs 42 which coöperate with the ring 23 and the bearing members 12 and 15 to prevent churning and bubbling of the oil in the well, when the shaft is operating at relatively high speeds, by confining the oil in the immediate vicinity of the rotating parts and the bearing balls to a small compass.

At the same time, the holes 27 and 28 and a series of radial holes 43 in the baffle member 41 permit the oil to circulate from the well to the bearing members.

In operation, centrifugal action forces the oil in the radial holes 26 outwardly and upwardly through the grooves 30 to the groove 32, from which it is discharged through the holes 33 and the slots 34 to the housing.

The oil in the holes 27 and 28 is forced outwardly into a comparatively small annular space in which the balls operate. The oil is discharged from this space through the radial holes 43 of the baffle member 41. The ring 18 is separated from the body of the housing by radial ribs 44 and, consequently, the oil flows freely from the well under the ring 18 and into the recess 25 in the shaft.

Other means may, of course, be provided for guiding the bearing balls and it is evident that various modifications in size and arrangement of parts may be effected within the spirit and scope of my invention.

I claim as my invention:

1. A thrust bearing comprising an oil well, annular bearing members operating therein, and a shaft carrying one of the annular members at its end and having a projection extending through said members into said oil well and provided with passages through which oil is supplied to the bearing members.

2. A thrust bearing comprising an oil well, a substantially vertical shaft having a recessed projection extending into the well, rings forming a ball race in the well at the end of the shaft, a plurality of bearing balls in said race, and radial passages in the shaft projection which terminate near the bearing balls and through which oil is supplied thereto.

3. A thrust bearing comprising an oil well, a stationary supporting ring in the well having a concave spherically curved surface, a bearing ring having a convex surface adjustably mounted on the supporting ring, a substantially vertical shaft having a longitudinally recessed shaft projection extending through the ring members into the oil well, interposed bearing balls between the bearing ring and the end of the shaft, and radial passages in the shaft projection communicating with the longitudinal recess and terminating near the bearing balls.

4. A thrust and guide bearing comprising a stationary cylindrical housing member, a lubricating-fluid receptacle secured thereto and forming a part of the bearing housing, a bearing member pivotally supported in the receptacle, a cylindrical bearing member supported in said cylindrical housing member, a shaft extending through the cylindrical bearing member and having a recessed projection extending through the bearing member in the receptacle, and radial passages communicating with the recess in the shaft projection for supplying lubricating fluid to the cylindrical bearing member and to the bearing member within the receptacle.

5. A thrust and guide bearing comprising a stationary cylindrical housing member, a lubricating-fluid receptacle secured thereto and forming a part of the bearing housing, rings forming a ball race and pivotally supported within the receptacle, a plurality of bearing balls operated in the ball race, a cylindrical bearing member supported in said cylindrical housing member, a shaft extending through the cylindrical bearing member and having a recessed projection extending through the bearing member in the receptacle, and radial passages communicating with the recess in the shaft projection for supplying lubricating fluid to the cylindrical bearing member and to the bearing balls.

6. A thrust bearing comprising an oil well, a substantially vertical shaft having a recessed projection extending into the well, rings forming a ball race in the well at the end of the shaft, a plurality of bearing balls in said race, and radial passages in the shaft projection which terminate near the bearing balls and through which oil is supplied thereto, and a baffle member surrounding the ball race and confining the oil in the immediate vicinity of the bearing balls to a relatively small volume.

7. A thrust bearing comprising an oil well, a stationary supporting ring in the well having a concave spherically curved surface, a bearing ring having a convex surface adjustably mounted on the supporting ring, a substantially vertical shaft having a longitudinally recessed shaft projection extending through the ring members into the oil well, interposed bearing balls between the bearing ring and the end of the shaft, and radial passages in the shaft projection communicating with the longitudinal recess and terminating opposite the bearing balls, and a perforated annular baffle member mounted on the supporting ring and restricting the quantity of oil in the immediate vicinity of the bearing rings.

In testimony whereof, I have hereunto subscribed my name this 1st day of March, 1912.

ROBERT SIEGFRIED.

Witnesses:
B. B. HINES,
M. CLARA MERZ.

Copies of this patent may be obtained for five cents each, by addressing the "Commissioner of Patents, Washington, D. C."